US007667738B2

(12) United States Patent
Utsugi

(10) Patent No.: US 7,667,738 B2
(45) Date of Patent: Feb. 23, 2010

(54) IMAGE PROCESSING DEVICE FOR DETECTING CHROMATIC DIFFERENCE OF MAGNIFICATION FROM RAW DATA, IMAGE PROCESSING PROGRAM, AND ELECTRONIC CAMERA

(75) Inventor: Akihiko Utsugi, Tokyo (JP)

(73) Assignee: Nikon Corporation, Tokyo (JP)

( * ) Notice: Subject to any disclaimer, the term of this patent is extended or adjusted under 35 U.S.C. 154(b) by 387 days.

(21) Appl. No.: 11/597,507

(22) PCT Filed: May 30, 2005

(86) PCT No.: PCT/JP2005/009873

§ 371 (c)(1), (2), (4) Date: Nov. 27, 2006

(87) PCT Pub. No.: WO2005/117455

PCT Pub. Date: Dec. 8, 2005

(65) Prior Publication Data

US 2008/0062409 A1  Mar. 13, 2008

(30) Foreign Application Priority Data

May 31, 2004 (JP) ............................. 2004-161474
Jan. 18, 2005 (JP) ............................. 2005-010349

(51) Int. Cl.
*H04N 5/228* (2006.01)
(52) U.S. Cl. .................................................. 348/222.1
(58) Field of Classification Search ............... 348/222.1
See application file for complete search history.

(56) References Cited

U.S. PATENT DOCUMENTS

| | | | |
|---|---|---|---|
| 7,346,210 B2 * | 3/2008 | Chen | 382/162 |
| 2001/0030697 A1 | 10/2001 | Dischert et al. | |
| 2004/0150732 A1 * | 8/2004 | Yamanaka | 348/272 |

FOREIGN PATENT DOCUMENTS

| | | |
|---|---|---|
| JP | A 62-285590 | 12/1987 |
| JP | A 06-113309 | 4/1994 |
| JP | A 10-013845 | 1/1998 |
| JP | A 11-55695 | 2/1999 |
| JP | A 2000-138944 | 5/2000 |
| JP | A 2000-299874 | 10/2000 |
| JP | A 2001-186533 | 7/2001 |
| JP | A 2002-112276 | 4/2002 |
| JP | A 2002-199410 | 7/2002 |
| JP | A 2002-344978 | 11/2002 |
| JP | A 2004-153323 | 5/2004 |
| JP | A 2004-241991 | 8/2004 |
| JP | A 2004-242113 | 8/2004 |
| WO | WO-03058554 A1 * | 12/2002 |

* cited by examiner

*Primary Examiner*—James M Hannett
(74) *Attorney, Agent, or Firm*—Oliff & Berridge, PLC

(57) ABSTRACT

An image processing device has an input section and a detecting section. The input section receives RAW data composed of color components arranged in each pixel in a predetermined pattern. The detecting section detects the color shift amount by calculating the correlation between two color components included in the RAW data and determines the chromatic aberration of magnification of the optical system used for capturing the image from the color shift amount.

15 Claims, 6 Drawing Sheets

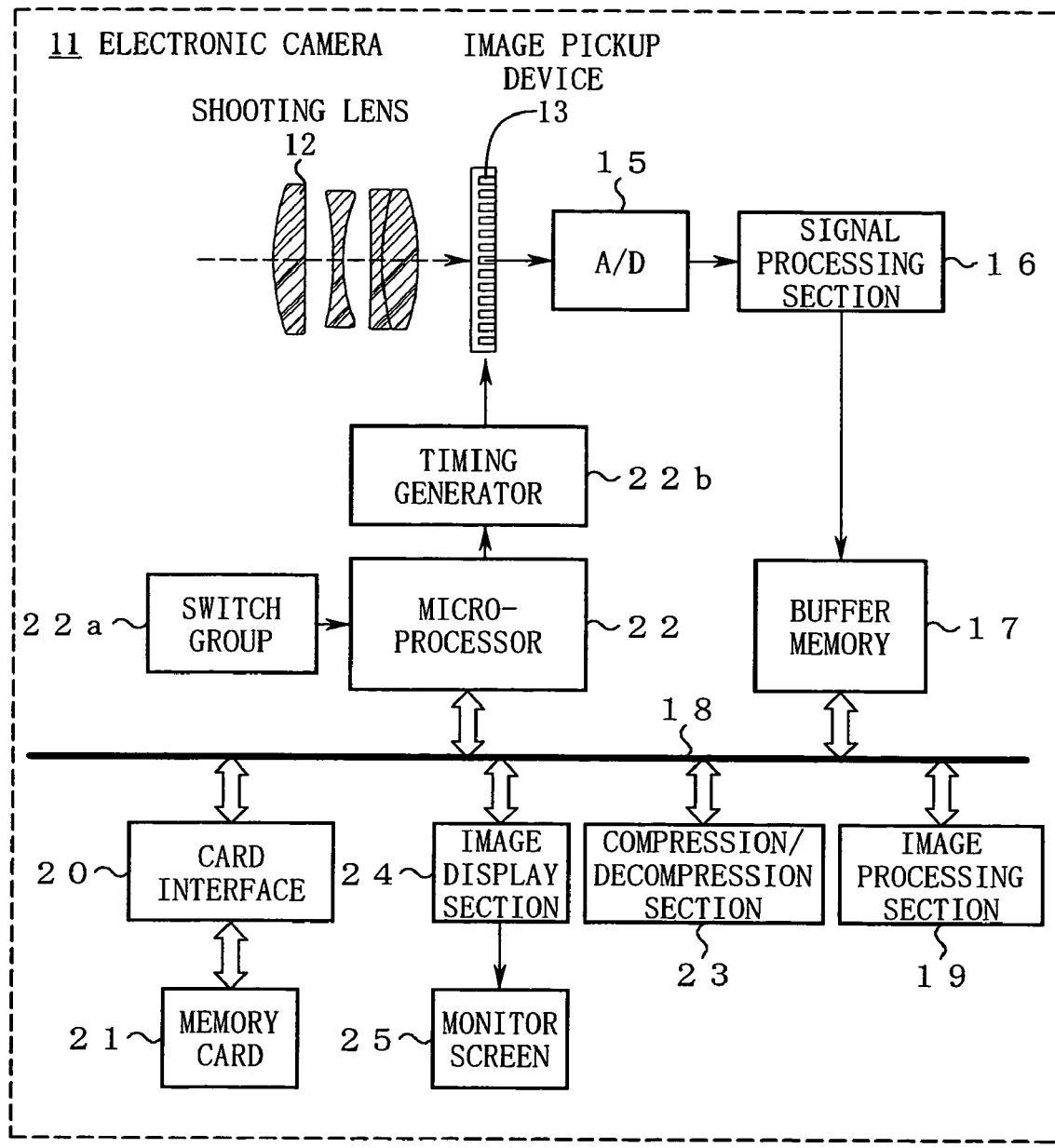

IMAGE PROCESSING DEVICE FOR DETECTING CHROMATIC DIFFERENCE OF MAGNIFICATION FROM RAW DATA, IMAGE PROCESSING PROGRAM, AND ELECTRONIC CAMERA

CROSS-REFERENCE TO RELATED APPLICATION

This application is a U.S. nationalization of International Application PCT/JP2005/009873, filed May 30, 2005, designating the U.S., and claims benefit of priority from Japanese Patent Application No. 2004-161474, filed on May 31, 2004 and No. 2005-010349, filed on Jan. 18, 2005, the entire contents of which are incorporated herein by reference.

TECHNICAL FIELD

The present invention relates to an image processing device that processes RAW data composed of color components arranged at each pixel in a predetermined pattern to detect the chromatic aberration of magnification. The present invention also relates to an image processing program that realizes the image processing device on a computer. Furthermore, the present invention relates to an electronic camera that incorporates the image processing device.

BACKGROUND ART

In an electronic camera, it is generally known that a color shift occurs in captured image data due to the chromatic aberration of magnification of an imaging optical system. There are known techniques to correct such a color shift through image processing.

For example, patent document 1 describes a technique to correct the chromatic aberration of magnification by detecting color shift at the edge portion of an image and performing image processing based on the detected color shift.

Further, patent document 2 describes a technique to correct the chromatic aberration of magnification by adjusting magnification of each color component of an image and finding the minimum difference between the color components.

Furthermore, patent document 3 describes that the chromatic aberration of magnification is corrected simultaneously with the color interpolation of RAW data. In addition, patent document 3 describes a technique to detect the chromatic aberration of magnification from RAW data by detecting a color shift between the same color components of RAW data obtained by imaging a standard pattern and of reference information (stored in advance) on the standard pattern without chromatic aberration.

Patent document 1: Japanese Unexamined Patent Application Publication No. 2000-299874
Patent document 2: Japanese Unexamined Patent Application Publication No. 2002-344978 (FIG. 1, FIG. 3)
Patent document 3: Japanese Unexamined Patent Application Publication No. 2001-186533 (paragraphs 0063 to 0066)

DISCLOSURE OF THE INVENTION

Problems to be Solved by the Invention

An electronic camera that incorporates a single-plate type image pickup device has color filters of RGB etc. arranged on an image pickup plane, and generates RAW data of each color component arranged at each pixel.

(Problems of Patent Documents 1 and 2)

With the conventional techniques in patent documents 1 and 2, chromatic aberration of magnification is detected from an image composed of color components aligned at each pixel. Because of this, in order to use the conventional techniques in patent documents 1 and 2, it is necessary to subject the RAW data to color interpolation processing first, and generate an image composed of color components aligned at each pixel.

However, the inventor of the present invention has found that performing color interpolation first causes a problem in detection of the chromatic aberration of magnification. That is, the color interpolation to the RAW data causes a false color noise at the edge etc. of an image. The false color noise cannot be discriminated from the chromatic aberration of magnification through the processing in patent documents 1 and 2. Accordingly, erroneous detection of the false color noise makes it difficult to detect the chromatic aberration of magnification.

Further, low pass filtering is often performed to chrominance components (hereinafter, chrominance LPF) in order to reduce the false color noise at the time of color interpolation. However, the chrominance LPF causes unevenness of the color shift due to the chromatic aberration of magnification, which makes it more difficult to detect the chromatic aberration of magnification. In other words, the color shift due to the chromatic aberration of magnification appears as a slight chrominance variation in an area of the image with high frequency such as an edge part and a fine picture part. The most of the slight chrominance variation is removed by the above-described chrominance LPF. On the other hand, in an area with a low spatial frequency (a part with gradual gradation change), the same color shift due to the chromatic aberration of magnification appears as a gradual chrominance variation in a low frequency range. The chrominance variation in the low frequency range cannot be removed by the above-described chrominance LPF and remains as it is. As a result, through the chrominance LPF, the image includes both an area with reduced chromatic aberration of magnification and an area with the remaining chromatic aberration of magnification remains (unevenness of the image).

The above-described patent documents 1 and 2 premise that the color shift due to the chromatic aberration of magnification occurs in a point symmetry with respect to the center of the image (optical axis center). However, the unevenness due to the chrominance LPF readily breaks the point symmetry. In such situation, it is difficult to detect the chromatic aberration of magnification according to patent documents 1 and 2.

For the above reasons, performing the color interpolation first makes the detection of the chromatic aberration of magnification very difficult.

(Problems of Patent Document 3)

Patent document 3 describes the technique to detect the chromatic aberration of magnification from the RAW data. However, this technique can be applied, only when the standard pattern is used. According to patent document 3, the reference information on the standard pattern without chromatic aberration is prepared in advance. Next, the standard pattern is actually photographed to obtain the RAW data having the chromatic aberration of magnification. The color shift is detected by comparing the RAW data of the standard pattern with the reference information without chromatic aberration.

However, the chromatic aberration of magnification differs depending on the photographic conditions (the kind of the lens, the zoomed position of the lens, the spectroscopic distribution of illumination light, spectroscopic sensitivity of the image pickup device, etc.). It is hard, time-consuming, and cost-ineffective to detect the chromatic aberration of magnification and record the data thereof in each of the photographic conditions according to patent document 3. Further, even if pre-recording of such data is possible, it is difficult to select correct data of the chromatic aberration of magnification since at actual photographing there are a variety of photographic conditions which cannot be specified such as the spectroscopic distribution of the illumination light. Consequently, it is very difficult to determine actual chromatic aberration of magnification of an image to be corrected, by measuring the color shift in advance according to patent document 3.

OBJECT OF THE PRESENT INVENTION

In view of solving the above problems, an object of the present invention is to provide a technique to detect the chromatic aberration of magnification from the normal RAW data without using the standard pattern or the like.

Further, another object of the present invention is to provide a technique to correctly detect the chromatic aberration of magnification without being affected by the false color, the chrominance LPF, etc.

<<1>>

An image processing device of the present invention has an input section and a detecting section. The input section receives RAW data. The RAW data is data composed of color components arranged at each pixel in a predetermined pattern. On the other hand, the detecting section detects a color shift amount by calculating correlation between two color components included in the RAW data and determines according to the color shift amount the chromatic aberration of magnification of the optical system used for capturing the image.

<<2>>

Preferably, the detecting section calculates the correlation between the two color components at different pixel positions. In this case, the detecting section determines the correct color shift amount by removing an amount corresponding to an interval of the pixel positions from the calculated correlation. Then, the chromatic aberration of magnification is determined according to the color shift amount.

<<3>>

Preferably, the input section interpolates one of the two color components and aligns the two color components at a pixel position of the other color component. The detecting section detects the color shift amount by calculating the correlation between the aligned two color components and determines the chromatic aberration of magnification according to the color shift amount.

<<4>>

Preferably, a main color component with a higher pattern density and a sub color component with a lower pattern density are selected as the two color components. The input section subjects the main color component to interpolation and generates an interpolated main color component at a pixel position of the sub color component. The detecting section detects the color shift amount from the correlation between the interpolated main color component and the sub color component.

<<5>>

Preferably, the detecting section divides the image into a plurality of areas and detects the color shift in the radial direction in each divided area. Next, the detecting section forms a resultant vector of the color shifts in neighboring divided areas. Due to this operation, it is possible to detect even the chromatic aberration of magnification which is not in a point symmetry with respect to the center of the image.

<<6>>

Preferably, the image processing device further comprises a correcting section which adjusts magnification between the color components of the RAW data so as to cancel the chromatic aberration of magnification determined in the detecting section and obtain the magnification-adjusted color components.

<<7>>

Preferably, the correcting section generates image data composed of a plurality of color components aligned at each pixel position, according to the magnification-adjusted color components.

<<8>>

An image processing program of the present invention causes a computer to function as the image processing device according to any one of the above-mentioned <<1>> to <<7>>.

<<9>>

An electronic camera of the present invention has the image processing device according to any one of the above-mentioned <<1>> to <<7>> and an image pickup section that images an object to generate RAW data. The electronic camera processes the RAW data generated in the image pickup section of the image processing device.

Advantageous Effects of the Invention

According to the present invention, the chromatic aberration of magnification is detected directly from the RAW data by detecting the color shift between two color components in the RAW data.

As a result, unlike patent documents 1 and 2, it is made possible to properly detect the chromatic aberration of magnification without being affected by the false color noise due to color interpolation, the unevenness of the color shift due to the chrominance LPF, etc.

Further, unlike patent document 3, the present invention succeeds to detect the chromatic aberration of magnification from not only the standard pattern but also general RAW data, by detecting the color shift between the two color components in the RAW data.

The above-described objects and the other objects of the present invention can be seen from the following description and accompanied drawings.

The nature, principle, and utility of the invention will become more apparent from the following detailed description when read in conjunction with the accompanying drawings in which like parts are designated by identical reference numbers, in which:

BRIEF DESCRIPTION OF THE DRAWINGS

FIG. 8 is a diagram showing an electronic camera in a fourth embodiment.

BEST MODES FOR CARRYING OUT THE INVENTION

First Embodiment

Figure 1:
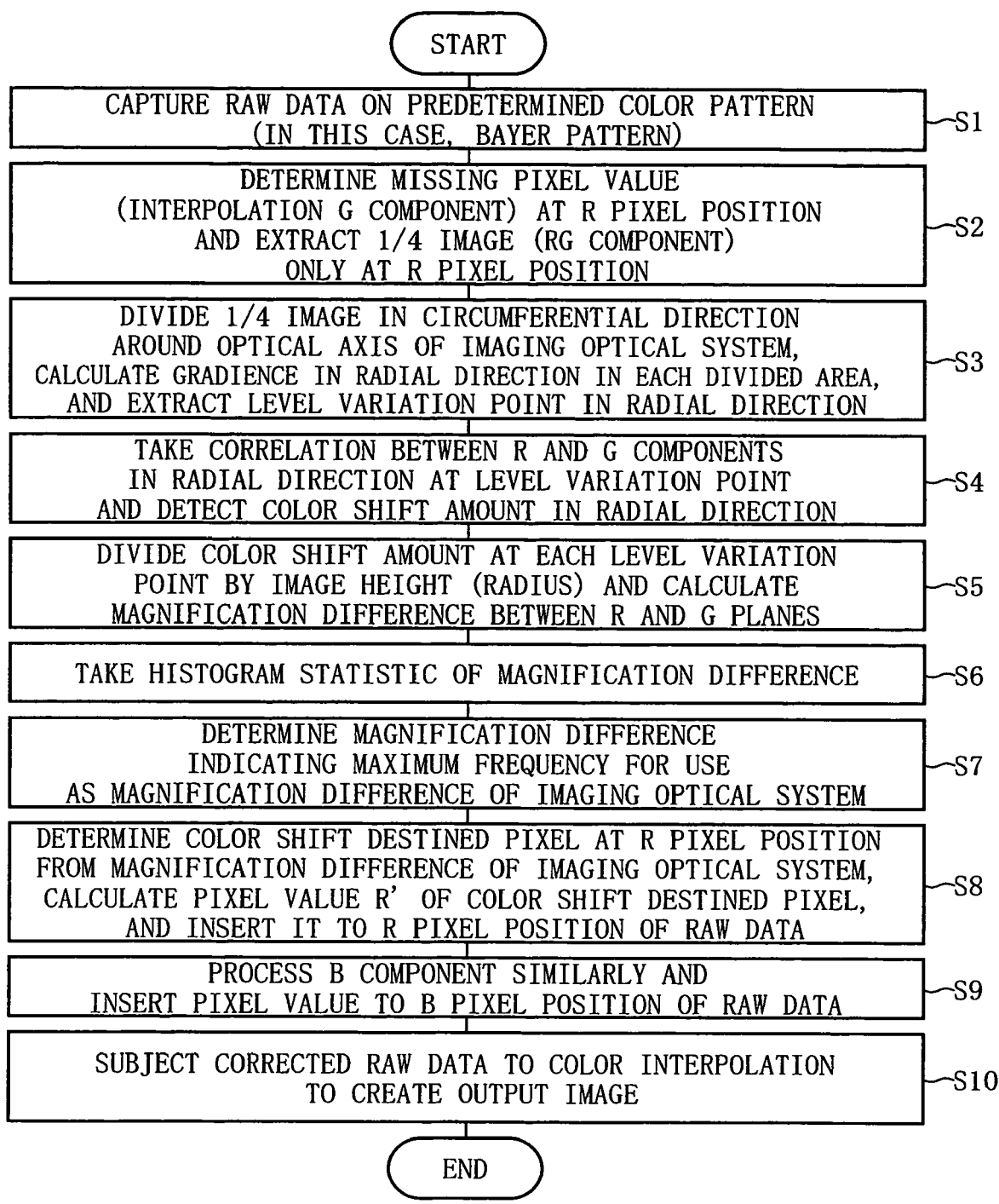
FIG. 1 is a flow chart for explaining a first embodiment.

FIG. 1 is flow chart for explaining a program according to a first embodiment. It is possible to cause a computer to function as an image processing device according to present invention by executing the program on the computer.

The operations in the first embodiment will be described below in the order of the step numbers shown in FIG. 1.

[Step S1]

The computer captures RAW data imaged by an electronic camera via a recording medium or communications interface. The RAW data is image data before subjected to color interpolation and image data in which RGB color components are bayer-patterned. Preferably, the RAW data is subjected to white balance adjustment and gamma correction in advance.

[Step S2]

The computer performs interpolation at the R pixel position of the RAW data using the G component in its vicinity and determines the interpolated G component. Next, the computer extracts the R component aligned at the R pixel position and the interpolated G component and generates an image with a quarter of the number of pixels (hereinafter, referred to as the "¼ image").

[Step S3]

The computer sets the center of the ¼ image by default as an optical axis center of an imaging optical system. Note that the computer may acquire the position of the optical axis center on the image from the electronic camera based on accompanying information to the RAW data.

Next, the computer divides the ¼ image in the circumferential direction around the optical axis center as the origin and sets a plurality of divided areas and the radial direction in each divided area.

Figure 2:
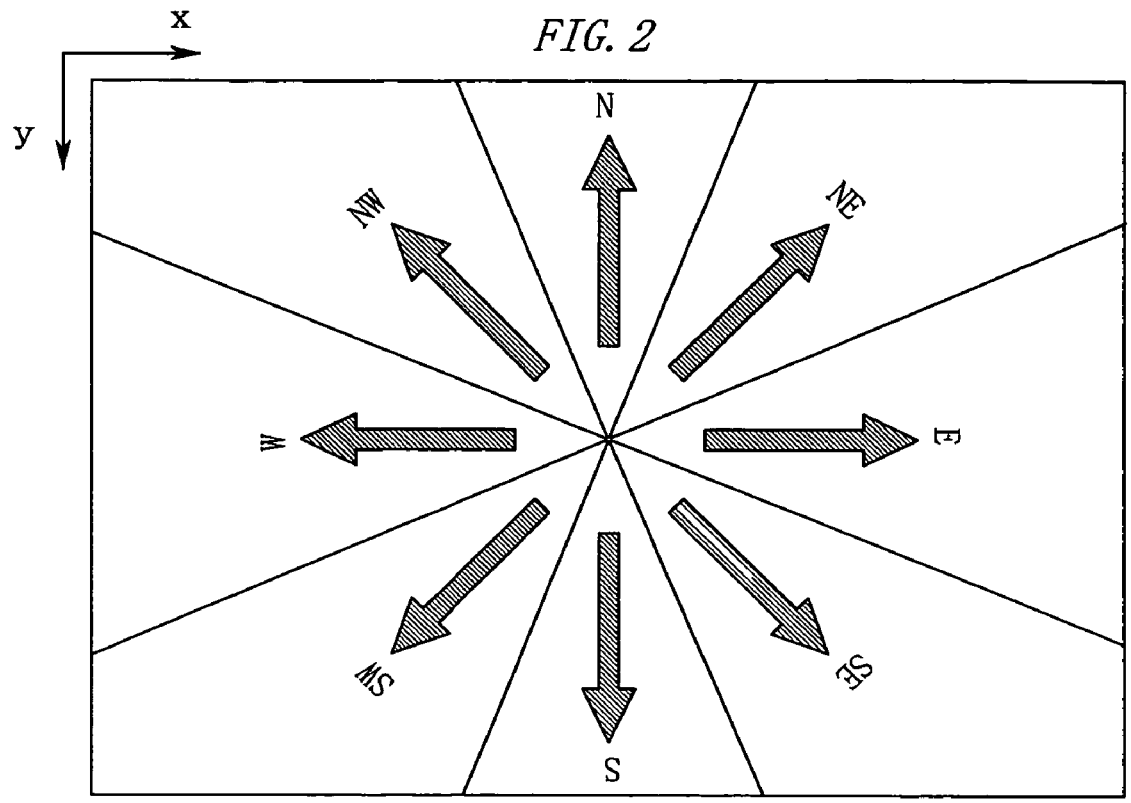
FIG. 2 is a diagram showing an example of the setting of divided areas and radial directions.

FIG. 2 is a diagram showing an example of the setting of the divided areas and the radial directions. In this setting, an input image is first divided into eight division areas, that is, N, NE, E, SE, S, SW, W, and NW and the arrow shown schematically is assumed to be the radial direction in each divided area.

Subsequently, the computer simply calculates the luminance Y from the RG components of the ¼ image using the following formula.

$Y=(R+G)/2$

The computer calculates a level variation in the luminance Y in the radial direction in an area of the image with visible chromatic aberration of magnification (an area distant from the optical axis center, or the like by half or more of the maximum image height).

Here, by fixing the radial direction in each divided area, it is made possible to perform a simple calculation based on the following formulas.

Divided area N: grad $Y(x, y)=Y(x, y-1)-Y(x, y)$

Divided area NE: grad $Y(x, y)=Y(x+1, y-1)-Y(x, y)$

Divided area E: grad $Y(x, y)=Y(x+1, y)-Y(x, y)$

Divided area SE: grad $Y(x, y)=Y(x+1, y+1)-Y(x, y)$

Divided area S: grad $Y(x, y)=Y(x, y+1)-Y(x, y)$

Divided area SW: grad $Y(x, y)=Y(x-1, y+1)-Y(x, y)$

Divided area W: grad $Y(x, y)=Y(x-1, y)-Y(x, y)$

Divided area NW: grad $Y(x, y)=Y(x-1, y-1)-Y(x, y)$

The computer finds a pixel position (x, y) at which the absolute value of the determined grad Y(x, y) indicates a predetermined value Th (for example, about 10 in the 256-gradation data) or more.

Figure 3:
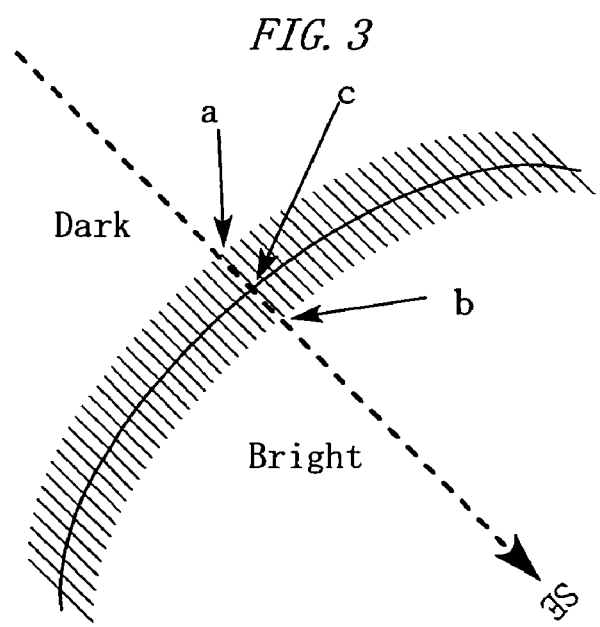
FIG. 3 is a diagram for explaining the detection of a level variation point.

At this time, at points as shown in FIG. 3, the computer determines a starting point a where the brightness begins to vary and an ending point b where the brightness stops varying. Next, the computer stores a middle point c of a and b as a level variation point and stores the distance between a and b as a thickness of the edge.

It may also be possible to detect the level variation in a discrete manner with predetermined sampling intervals on the image.

[Step S4]

The computer sets a local window around the level variation point in the vicinity of the level variation point of the ¼ image and acquires the G pattern in the window. Further, the computer acquires the R pattern from the position to which the window has been displaced in the radial direction. Next, the computer calculates the difference between the G pattern and the R pattern in each pixel after adjusting each signal level so that the average value of the G pattern and the average of the R pattern coincide with each other and determines a superposition error by cumulatively adding the absolute values of the differences.

The computer finds a displacement amount at which the superposition error is minimum (or locally minimum) while varying the displacement amount of the R pattern against the G pattern and stores the displacement amount at this time as the color shift amount between the RG components.

It is preferable, at this time, to determine the color shift amount to a precision equal to or less than the pixel interval by interpolating the value of the superposition error.

It is also preferable to set the window wider in accordance with the thickness of the edge determined in step S3. In particular, it is preferable to set the width of the window to about four times the thickness of the edge. By such a window adjustment, it is made possible to accommodate the characteristics of the level variation at both the steep edge and the gradual edge into the window. As a result, it is made possible to properly detect the color shift at both the steep edge and the gradual edge.

[Step S5]

The computer calculates the magnification difference between the R plane and the G plane by dividing the color shift amount determined for each level variation point of the ¼ image by the image height (the radius from the optical axis center) at the level variation point.

[Step S6]

The computer sums the frequency of the magnification differences determined for the respective level variation points and creates a histogram distribution.

Figure 4:
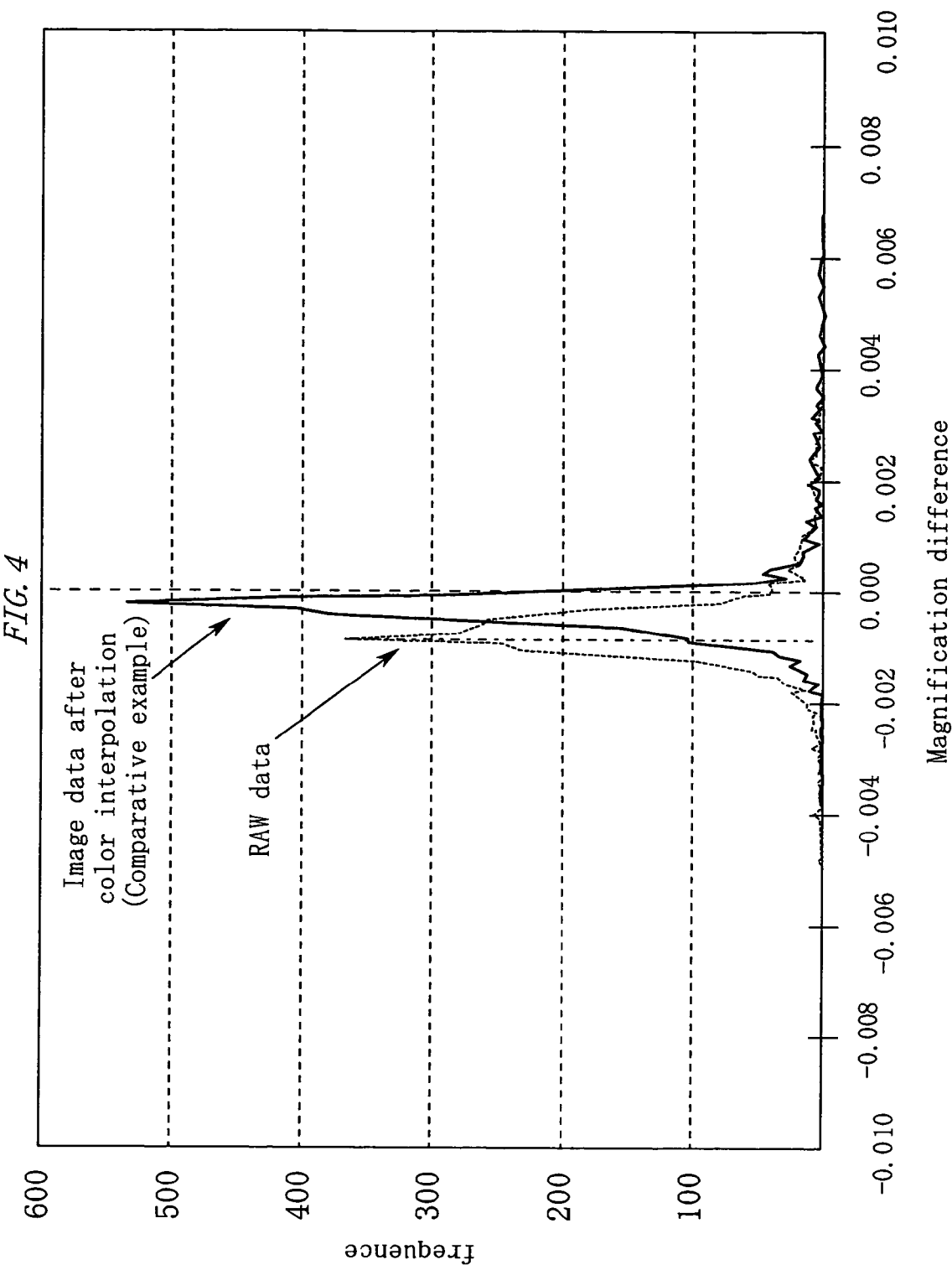
FIG. 4 is a diagram showing a histogram distribution of the magnification difference.

FIG. 4 is a diagram showing an example of the histogram distribution.

The dotted line in FIG. 4 indicates the histogram distribution of the magnification difference of the RAW data. In the case of the RAW data, since not being subjected to the reduction action of the chromatic aberration of magnification due to the chrominance LPF, the foot shape is symmetric about the center of the mode, showing approximately a normal distribution. In this case, it can be thought that the value of the mode indicates the magnification difference of the imaging optical system to be determined.

On the other hand, the solid line shown in FIG. 4 shows the histogram distribution determined for the input image after the color interpolation and the chrominance LPF. The mode of the solid line assumes a value of approximately zero. This shows that the image after the chrominance LPF is impossible to detect its color shift at almost all the parts of the edge. Because of this, it becomes very difficult to detect the chromatic aberration of magnification from the input image after the chrominance LPF. In the present embodiment, this problem is solved by detecting the color shift directly from the RAW data.

[Step S7]

The computer determines the mode (or average, median, etc.) from the histogram distribution (the histogram shown by the dotted line in FIG. 4) of the magnification difference determined from the RAW data and stores it as a magnification difference k of the imaging optical system.

[Step S8]

Next, the computer calculates the following formula using the magnification difference k of the ¼ image and determines the color shift of the R plane as a displacement vector (dx, dy) for each pixel position (x, y) of the ¼ image.

$$dx = -k(x-xo)$$

$$dy = -k(y-yo)$$

Here, (xo, yo) is the optical axis center.

Subsequently, the computer determines the position (x−dx, y−dy) of the R pixel displaced due to the chromatic aberration of magnification from the pixel position (x, y) of the G plane and the displacement vector (dx, dy) and uses it as the reference position.

Next, the computer calculates a value R' of the R pixel at the reference position (x−dx, y−dy) by interpolation processing (for example, Cubic interpolation) of the input image.

The computer inserts the pixel value R' after the color shift correction into the R pixel position of the RAW data corresponding to (x, y) of the ¼ image. The R pixel position of the RAW data corresponding to (x, y) of the ¼ image is any one of (2x, 2y), (2x+1, 2y), (2x, 2y+1), and (2x+1, 2y+1) according to the bayer pattern.

[Step S9]

Next, the computer processes also the B component of the RAW data similarly and inserts a pixel value B' after the color shift correction into the B pixel position of the RAW data.

[Step S10]

The computer subjects the RAW data for which the color shift correction has been completed to the publicly known color interpolation processing including extrapolation of different color components and the chrominance LPF and generates an output image having color components per pixel.

Effects of the First Embodiment Etc.

In the first embodiment, simple interpolation is performed at generation of a thinned image (corresponding to the above-mentioned ¼ image) of the number of pixels reduced to that of the sub color component (corresponding to the above-mentioned R component). However, the simple interpolation is a processing to generate the interpolated G component using only the G component, so that the chromatic aberration of magnification that has occurred in the R component and the B component is kept as it is. Consequently, such a thinned image of this kind is an image that maintains the chromatic aberration of magnification of the RAW data faithfully and it is possible to accurately detect the chromatic aberration of magnification of the RAW data by detecting the color shift from the thinned image.

In addition, by handling a thinned image having a small image size, it is possible to obtain effects such as that the processing load is alleviated, the required memory capacity is reduced, and the operation speed is increased.

Further, in the first embodiment, after the correction of the chromatic aberration of magnification of the RAW data, the color interpolation processing is performed. Due to the aberration correction of the RAW data, the image of different colors in the RAW data is restored correctly. This consequently makes it possible to perform, with very high precision, the known color interpolation processing to properly switch the interpolation sequences in accordance with the image structure of difference colors. As a result, the false color noise is reduced drastically, enabling improvement in the final image quality synergistically.

It may also be possible to use the first embodiment for detecting the chromatic aberration of magnification and to use the technique described in Japanese Unexamined Patent Application Publication No. 2001-186533 for the correction of the chromatic aberration of magnification and the color interpolation. However, in the first embodiment, the chromatic aberration of magnification is corrected only for the R component and the B component of the RAW data and therefore it is possible to reduce the processing load more than in the method according to Japanese Unexamined Patent Application Publication No. 2001-186533.

Second Embodiment

Figure 5:
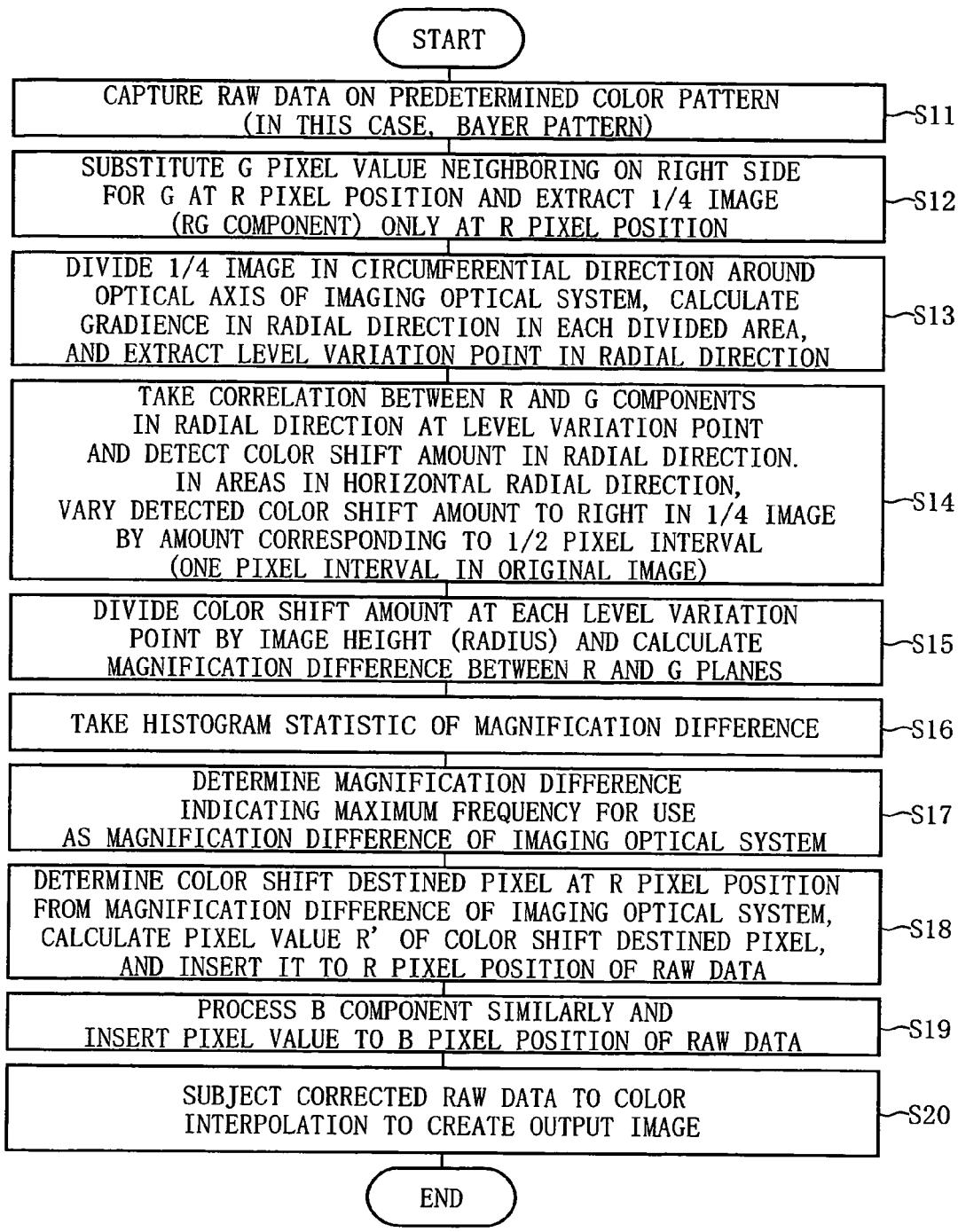
FIG. 5 is a flow chart for explaining a second embodiment.

FIG. 5 is a flow chart showing the operations in the second embodiment. Explanation is given below in the order of the step numbers shown in FIG. 5.

[Step S11] This step is the same as step S1 in the first embodiment.

[Step S12] The computer substitutes the pixel value G on the right side for the missing G component at the R pixel position of the RAW data. Next, the computer extracts the R component and the G component having been aligned to the R pixel position and generates an image with a quarter of the number of pixels (hereinafter, referred to as the "¼ image").

[Step S13] This step is the same as step 3 in the first embodiment.

[Step S14] The computer detects the color shift amount of the ¼ image in the same manner as that in step S4 in the first embodiment. However, in the ¼ image in the second embodiment, the correct position of the G component is shifted to the right by the amount corresponding to the ½ image. Then, in the areas in a horizontal radial direction (E and W in FIG. 2), the determined color shift amount is shifted to the right in the ¼ image by the amount corresponding to the ½ pixel interval (one pixel interval in the original image).

[Steps S15 to S20] These steps are the same as steps S5 to S10 in the first embodiment.

Effects of the Second Embodiment Etc.

In the second embodiment, the same effects as those in the first embodiment can be obtained.

Further, in the second embodiment, the G interpolation is omitted unlike the first embodiment. As a result, processing at higher speed than that in the first embodiment is made possible.

Third Embodiment

Figure 6:
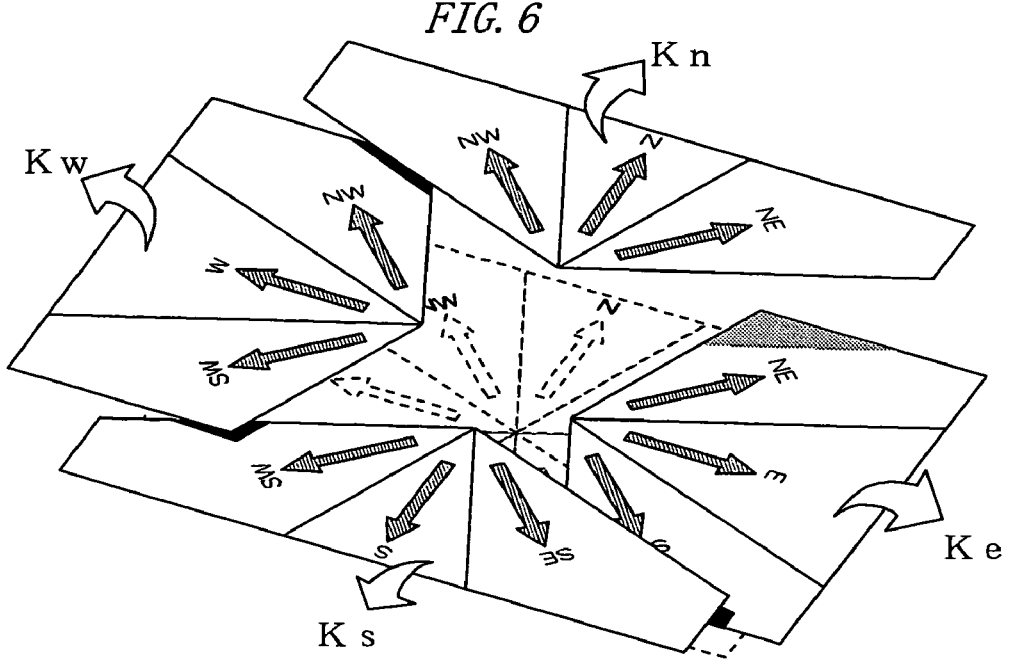
FIG. 6 is a diagram for explaining area division in a third embodiment.
Figure 7:
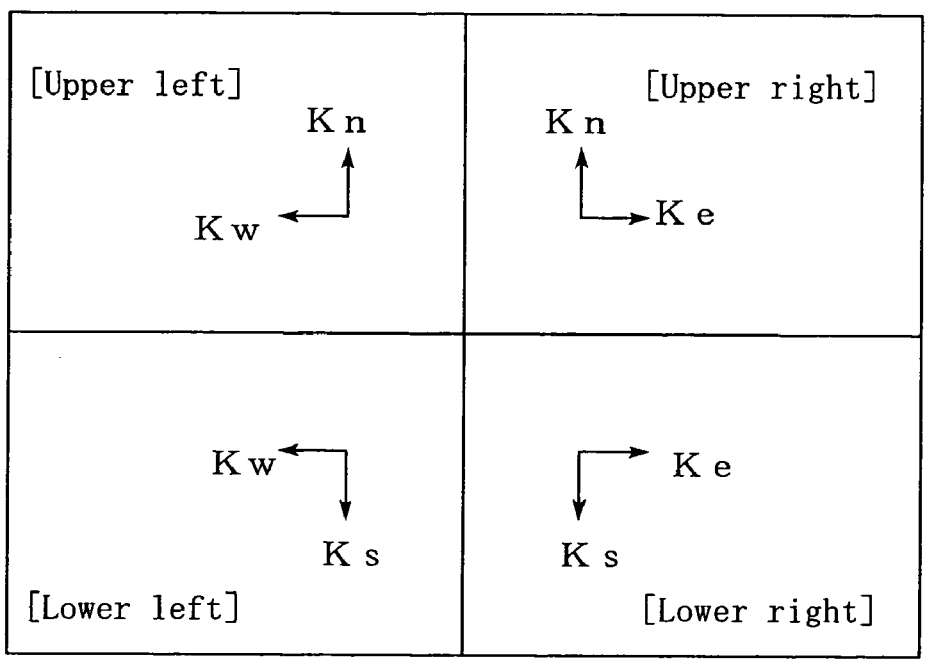
FIG. 7 is a diagram for explaining the calculation of a displacement vector.

FIG. 6 and FIG. 7 are diagrams for explaining the third embodiment.

In general, the optical axis center of the imaging optical system is located substantially at the center of the image data. Because of this, normally, the chromatic aberration of magnification occurs in a point symmetry with respect to the center.

However, in some imaging optical systems (shift lens and camera shake correction lens), the optical axis center of the imaging optical system does not necessarily coincide with the center of the image data. Further, a case may be supposed, where the optical axis center of the imaging optical system does not coincide with the center of the data any longer due to the trimming (cropping) of the image data by the processing on an electronic camera or a computer. Furthermore, a case is also supposed, where the chromatic aberration of magnification does not occur in a point symmetry with respect to the center due to the manufacturing errors of the lens. Still furthermore, there may be a case where the color shift occurs differently from area to area because the color shift that occurs in an image depends also on the spectroscopic distribution of the object. In such cases, if the color shift is corrected in a point symmetry with respect to the center, the correction effect is reduced slightly.

Therefore, the third embodiment discloses a color shift correction which is effective even in such cases where the optical axis center is shifted from the center of the image.

The operations in the third embodiment will be described below.

(1) The computer executes the operations in the above-described steps S1 to S7 or steps S11 to S17 and calculates the magnification difference of the color shift in each of the eight divided areas N, NE, E, SE, S, SW, W, and NW.

(2) Next, as shown in FIG. 6, the computer combines these divided areas in threes and classifies them into the upper side group (NW, N, NE), the right side group (NE, E, SE), the lower side group (SE, S, SW), and the left side group (SW, W, NW). The computer analyzes the histogram of the magnification difference and determines four magnification differences Kn, Ke, Ks, and Kw, respectively, for each of the four groups.

(3) Subsequently, as shown in FIG. 7, the computer divides the image into four areas, the top-right, the bottom-right, the bottom-left, and the top-left. The computer calculates the displacement vector (dx, dy) of the color shift by combining the magnification differences in the neighboring groups and forming resultant vectors in accordance with the following formulas.

Top-right: $dx=-ke(x-xo), dy=-kn(y-yo)$

Bottom-right: $dx=-ke(x-xo), dy=-ks(y-yo)$

Bottom-left: $dx=-kw(x-xo), dy=-ks(y-yo)$

Top-left: $dx=-kw(x-xo), dy=-kn(y-yo)$

Here, (xo, yo) is the center of the image.

As described above, vectors of the magnification differences in the plurality of directions are combined for use. At this time, if the magnification differences in the respective directions differ from one another, the intersection of the displacement vectors in the above formulas, that is, the optical axis center, shifts from the center of the image (xo, yo). Consequently, even in a case where the optical axis center shifts from the center of the image (xo, yo), it is made possible to flexibly deal with using the above calculations and it is made possible to calculate the displacement vectors more properly and more general-purposely.

The operations after the displacement vector (dx, dy) is determined are the same as those in the first or second embodiment and therefore the explanation is omitted here.

Fourth Embodiment

A fourth embodiment concerns an electronic camera according to the present invention.

FIG. 8 is a block diagram showing a configuration of the present embodiment.

In FIG. 8, a shooting lens 12 is mounted on an electronic camera 11. In the image space of the shooting lens 12, the light-receiving surface of an image pickup device 13 is arranged. The operation of the image pickup device 13 is controlled by an output pulse of a timing generator 22b.

An image generated by the image pickup device 13 is stored temporarily in a buffer memory 17 via an A/D conversion section 15 and a signal processing section 16.

The buffer memory 17 is connected to a bus 18. To the bus 18, an image processing section 19, a card interface 20, a microprocessor 22, a compression/decompression section 23, and an image display section 24 are connected. Among these, the card interface 20 writes and reads data to and from a detachable memory card 21. Further, to the microprocessor 22, a signal of the user operation from a switch group 22a of the electronic camera 11 is input. Furthermore, the image display section 24 displays an image on a monitor screen 25 provided on the backside of the electronic camera 11.

The electronic camera 11 having such a configuration executes the image processing in the first to third embodiments by means of the microprocessor 22 and/or the image processing section 19.

As a result, it is possible to create image data, from which the influence of the chromatic aberration of magnification of the shooting lens 12 has been reduced, in the electronic camera 11.

Supplementary Items of the Embodiments

The above-described embodiments have described software processing as an example. However, the present invention is not limited thereto. It may also be possible to realize the same processing by hardware.

The present invention can be realized in various forms without departing from its sprit or main characteristics. The above embodiments are only illustrative examples from all the standing points and should not be interpreted limitedly. The scope of the present invention is specified by the scope of claims and not limited by the description of the specification. Further, modifications and alterations belonging to the equivalent scope of claims are all included in the scope of the present invention.

The invention claimed is:

1. An image processing device comprising:
   an input section that receives RAW data composed of color components arranged at each pixel in a predetermined pattern; and
   a detection section that calculates correlation between two of said color components included in said RAW data to detect a color shift amount, and determines, according to said color shift amount, chromatic aberration of magnification of an optical system used for capturing said RAW data, wherein said detecting section calculates the correlation between said two color components arranged at different pixel positions, determines the color shift amount by removing an amount corresponding to an interval of said pixel positions from the calculated correlation, and determines the chromatic aberration of magnification according to said color shift amount.

2. The image processing device according to claim 1, comprising a correcting section that adjusts magnification between the color components of the RAW data so as to cancel the chromatic aberration of magnification determined in said detecting section and obtain magnification-adjusted color components.

3. The image processing device according to claim 2, wherein
said correcting section generates image data composed of a plurality of color components aligned at each pixel position, according to the magnification-adjusted color components.

4. An image processing program that causes a computer to function as the image processing device according to claim 1.

5. An electronic camera comprising:
the image processing device according to claim 1: and
an image pickup section that images an object to generate RAW data, wherein
the RAW data generated in said image pickup section is subjected to processing of said image processing device.

6. An image processing device comprising:
an input section that receives RAW data composed of color components arranged at each pixel in a predetermined pattern; and
a detecting section that calculates correlation between two of said color components included in said RAW data to detect a color shift amount, and determines, according to said color shift amount, chromatic aberration of magnification of an optical system used for capturing said RAW data, wherein:
said input section interpolates one of said two color components and aligns said two color components at a pixel position of the other color component;
said detecting section detects the color shift amount by calculating the correlation between the aligned two color components and determines the chromatic aberration of magnification according to said color shift amount;
said two color components are composed of a main color component with a higher pattern density and a sub color component with a lower pattern density;
said input section subjects said main color component to interpolation and generates an interpolated main color component at a pixel position of said sub color component; and
said detecting section detects said color shift amount from the correlation between said interpolated main color component and said sub color component.

7. The image processing device according to claim 6, comprising a correcting section that adjusts magnification between the color components of the RAW data so as to cancel the chromatic aberration of magnification determined in said detecting section and obtain magnification-adjusted color components.

8. The image processing device according to claim 7, wherein
said connecting section generates image data composed of a plurality of color components aligned at each pixel position, according to the magnification-adjusted color components.

9. An image processing program that causes a computer to function as the image processing device according to claim 6.

10. An electronic camera comprising:
the image processing device according to claim 6: and
an image pickup section that images an object to generate RAW data, wherein
the RAW data generated in said image pickup section is subjected to processing of said image processing device.

11. An image processing device comprising:
an input section that receives RAW data composed of color components arranged at each pixel in a predetermined pattern; and
a detecting section that calculates correlation between two of said color components included in said RAW data to detect a color shift amount, and determines, according to said color shift amount, chromatic aberration of magnification of an optical system used for capturing said RAW data, wherein
said detecting section divides the image into areas, detects the color shift in each divided area in a radial direction, and detects even the chromatic aberration of magnification which is not in a point symmetry with respect to a center of said RAW data by forming a resultant vector of the color shifts in neighboring divided areas.

12. The image processing device according to claim 11, comprising a correcting section that adjusts magnification between the color components of the RAW data so as to cancel the chromatic aberration of magnification determined in said detecting section and obtain magnification-adjusted color components.

13. The image processing device according to claim 12, wherein
said correcting section generates image data composed of a plurality of color components aligned at each pixel position, according to the magnification-adjusted color components.

14. An image processing program that causes a computer to function as the image processing device according to claim 11.

15. An electronic camera comprising:
the image processing device according to claim 11: and
an image pickup section that images an object to generate RAW data, wherein
the RAW data generated in said image pickup section is subjected to processing of said image processing device.

* * * * *